Sept. 11, 1962   G. E. EVANS ETAL   3,054,030
ELECTRODES FOR ELECTROCHEMICAL DEVICES
Filed Nov. 28, 1958

INVENTORS.
GEORGE E. EVANS
ROBERT A. POWERS
NELSON N. ESTES
EARL S. SNAVELY, JR.
BY John F. Hohmann United States Patent Office 3,054,030
Patented Sept. 11, 1962

3,054,030
ELECTRODES FOR ELECTROCHEMICAL DEVICES
George E. Evans, Rocky River, and Robert A. Powers, Lakewood, Ohio, Nelson N. Estes, Austin, Tex., and Earl S. Snavely, Jr., Oak Ridge, Tenn., assignors to Union Carbide Corporation, a corporation of New York
Filed Nov. 28, 1958, Ser. No. 777,012
4 Claims. (Cl. 317—230)

This invention relates to electrodes for electrochemical devices.

A family of electrochemical devices utilizing solutions of ions has recently attracted considerable favorable attention. These devices have been termed "solions." Typical solions are described by Ray M. Hurd and R. N. Lane, in vol. 104, No. 12, of Journal of the Electrochemical Society (December 1957); by H. B. Reed, Jr. and J. B. McQuitty, in vol. XXXII, No. 5, of Yale Scientific Magazine (February 1958); and in Electronics Products Engineering Bulletin No. 1 published November 1957, by National Carbon Company, 30 East 42nd St., New York 17, New York. In some of these devices an electrolyte composed of a redox system such as potassium iodide-iodine or potassium ferricyanide-ferrocyanide is employed in contact with inert electrodes usually of platinum. Typical solion devices of this kind are described and claimed in the application of Earl S. Snavely, Jr. filed February 26, 1958, Ser. No. 717,621, now United States Patent No. 2,890,414, issued June 9, 1959.

Platinum electrodes have two serious disadvantages for use in solions; the first and obvious disadvantage is their high cost. The second is the fact that they tend to catalyze undesirable side reactions with the electrolyte, particularly in the potassium iodide-iodine system wherein nonaqueous solvents may be employed.

It is the principal object of the present invention to provide electrodes for solions, which electrodes are free of the disadvantages of electrodes heretofore used.

In accordance with the invention this object is achieved by an electrode at least the electrolyte-contacting portions of which are composed of pyrolytic carbon.

Figure 1:
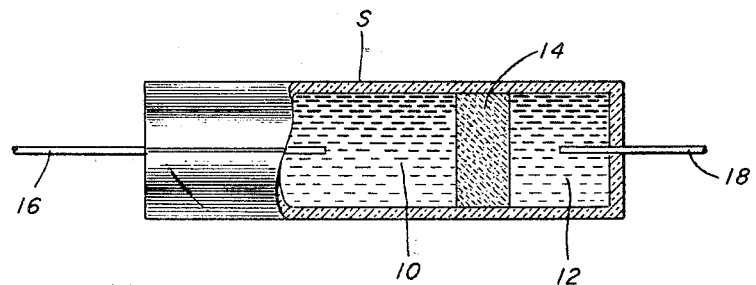
Figure 2:
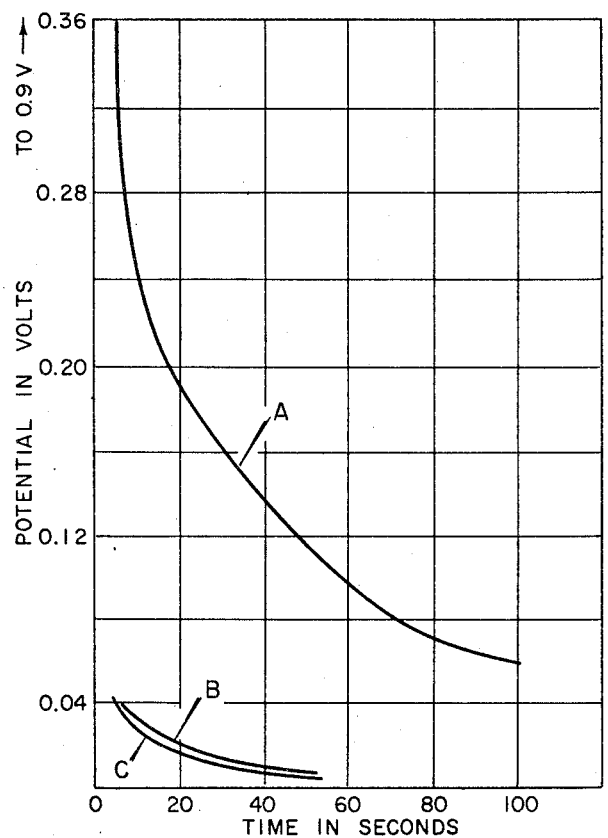

In the accompanying drawing:

FIG. 1 is an elevation, part being broken away, of a typical solion provided with electrodes embodying the invention; and FIG. 2 is a group of curves comparing voltage decay characteristics of solions provided with different types of electrodes.

Referring to FIG. 1, the solion S there shown comprises a vessel, suitably of glass, divided into two compartments 10, 12 by a porous plug or disc 14 of "fritted" or sintered glass. Both compartments 10, 12 are filled with electrolyte solution containing a reversible redox system. In each compartment is one of a pair of electrodes 16, 18 extending outwardly of the vessel. The particular device illustrated in FIG. 1 is an integrator of the type described in the Snavely application above referred to. When an electrical signal is impressed upon it, a species of the reversible redox system is caused to move from one compartment to the other. This movement can be read to give the integral of the signal impressed over a period of time. The electrodes 16, 18, in accordance with the invention, have their active surfaces composed of pyrolytic carbon.

Pyrolytic carbon is carbon which is produced by the decomposition of a carbon compound such as a hydrocarbon at very high temperatures, that is, at least about 1800° C. and preferably above 2100° C., and the deposition of carbon onto a substrate of carbon, metal, or refractory such as quartz. It is very dense, approaching the real density of carbon. It is also substantially impervious to fluids. Suitable materials for use in the preparation of pyrolytic carbon include methane, benzene, propane and naphthalene.

A number of electrodes for solions have been made by decomposing methane at about 2100° C. and causing the deposition of carbon therefrom on a carbon or graphite substrate. The finished electrodes were small rods 0.04 to 0.05 inch in diameter.

Electrodes so prepared were mounted in simple solion cells and were subjected to a number of tests in comparison with similar cells provided with electrodes of platinum and cells provided with electrodes made of spectrographic carbon in the form of rods 1/8 inch in diameter. In one of such tests, which an electrolyte in the ferricyanide-ferrocyanide system, the cells were charged at a bias voltage of about 0.9 volt until an equilibrium current was obtained. The circuit was opened, and cell voltage was measured as a function of time. It is desirable under these conditions that the voltage decay very rapidly.

Results of these tests are presented graphically in FIG. 2 of the drawing. Curve A is the voltage decay curve of cells provided with spectrographic carbon electrodes. It will be observed that after about 5 seconds the voltage was still about 0.36, after 10 seconds it was about 0.24 and after 60 seconds was still about 0.1 volt. In contrast to this curve, the voltage decay curves for both platinum and pyrolytic carbon electrodes, curves B and C, respectively, are outstanding. Thus after 5 seconds the voltage for both was about 0.04, while in 20 seconds it had fallen to about 0.02 volt. Actually the decay curve is so steep that the recorder used in the experiments could not keep up with it in the initial drop.

It is believed that the poor performance of the spectrographic carbon electrode is due to porosity of the electrode and consequent penetration of electrolyte into its pores. The pyrolytically deposited carbon is substantially nonporous, hence the electrolyte can not penetrate it.

From the above data, and other tests as well, it is evident that pyrolytic carbon is an excellent electrode material for solions. For example, the high hydrogen overvoltage of carbon permits increased bias voltage, thus permitting greater power output from these devices. Also, pyrolytic carbon is less susceptible to side reactions with the electrolyte than is platinum.

We claim:

1. In a solion having an electrolyte solution comprising a reversible redox system, the improvement which comprises at least one electrode in contact with said solution at least the active surfaces of which are composed of pyrolytic carbon, said improvement imparting rapid voltage decay characteristics to said solion.

2. A solion as defined by claim 1 in which said electrode comprises a carbon substrate and a surface layer of pyrolytic carbon thereon.

3. A solion as defined by claim 1 in which said electrode comprises a graphite substrate and a surface layer of pyrolytic carbon thereon.

4. A solion as defined by claim 1 in which said electrode comprises a metal substrate and a surface layer of pyrolytic carbon thereon.

References Cited in the file of this patent

UNITED STATES PATENTS

| | | |
|---|---|---|
| 445,687 | Bottome | Feb. 3, 1891 |
| 673,952 | Hildburgh | May 14, 1901 |
| 782,826 | Churcher | Feb. 21, 1905 |
| 1,020,698 | Kelley | Mar. 19, 1912 |
| 1,470,300 | Szarvasy | Oct. 9, 1923 |
| 1,473,883 | Slipian | Nov. 13, 1923 |
| 2,582,764 | Bailey | Jan. 15, 1952 |
| 2,764,530 | Klemgard | Sept. 25, 1956 |
| 2,764,653 | Schoeppel | Sept. 25, 1956 |
| 2,890,414 | Snavely | June 9, 1959 |
| 2,910,648 | Keller | Oct. 27, 1959 |